United States Patent Office 3,348,978
Patented Oct. 24, 1967

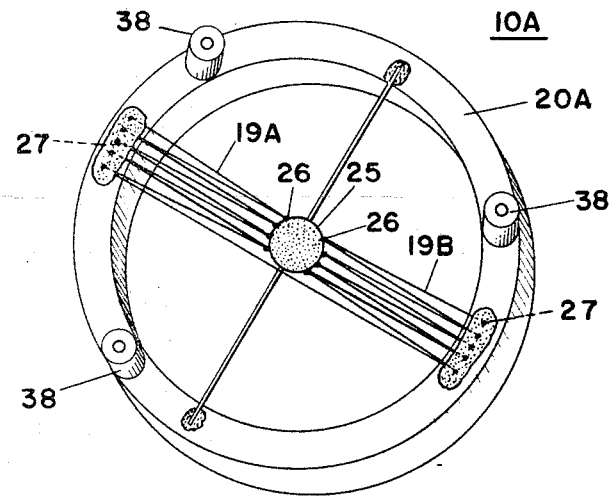
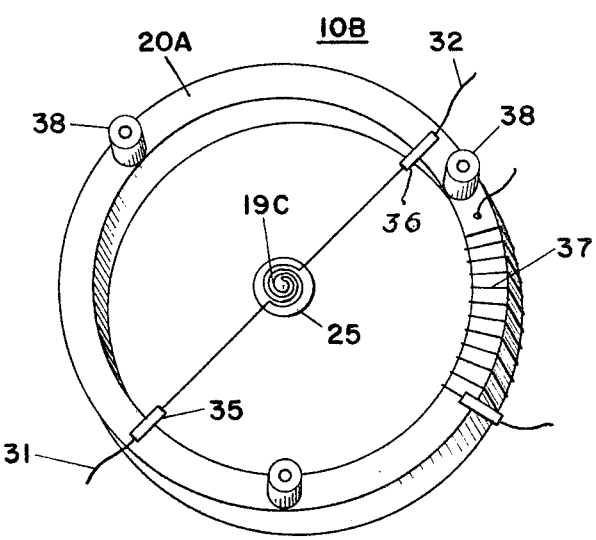
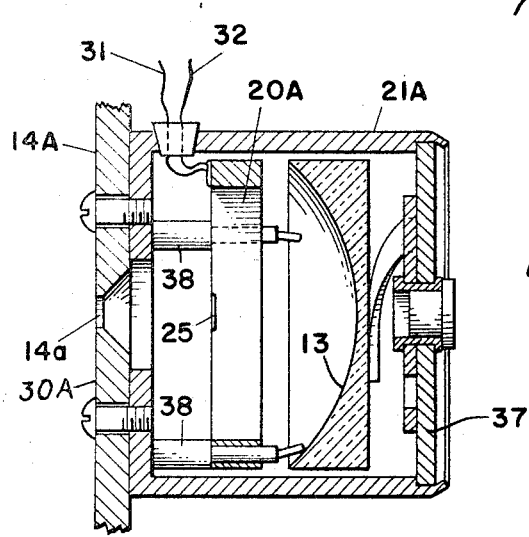

3,348,978
TRANSDUCERS FOR RADIATION PYROMETERS
Albert B. Teague, Glenside, Pa., assignor to Leeds & Northrup Company, Philadelphia, Pa., a corporation of Pennsylvania
Filed Feb. 27, 1964, Ser. No. 347,762
13 Claims. (Cl. 136—214)

This invention relates to radiation pyrometers and particularly to transducers therein used to convert radiation received from an external source to an electrical effect, such as a voltage, current or resistance-change.

In general, transducers for this field of electrical measurement comprise a target element which is heated by the received radiation and which is in intimate heat-conductive relation to a temperature-sensitive electrical means such as a thermopile or temperature-sensitive resistor. At temperature equilibrium of the target, the output of its associated temperature-sensitive electrical means is a measure of the intensity of the received radiation: upon a change in intensity of the received radiation, the interval required for the transducer output to assume a new steady-state value is a function of the thermal time-constant of the transducer.

It is an object of the present invention significantly to increase the electrical output of a radiant energy transducer without appreciably decreasing its speed of response to a change of radiation input.

In attainment of such objective, there is provided structural means of low thermal mass providing, in the path of radiation to the target area, a surface in close spaced relation to such area and in thermal-conductive relation therewith. Specifically, such structural means is a thin layer or coating of tiny hollow spheres of glass, silica, or like transparent dielectric bonded to at least one side of the target.

Also in accordance with the present invention as applied to radiant energy transducers of the thermopile type, the pairs of thermocouple elements extend from the target in the form of a cage having a truncated cone-like configuration with the target as a frustrum surface intermediate and spaced substantially both from the base and apex of the cone.

The invention further resides in radiant energy transducers having novel and useful features of construction, combination and arrangement hereinafter described and claimed.

For a more detailed understanding of the invention, reference is made to the following description for various specific embodiments thereof and to the accompanying drawings in which.

Figure 2:
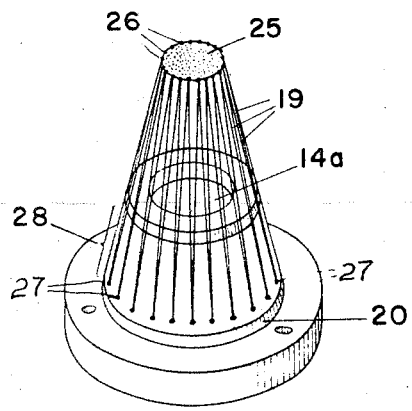
FIG. 2 is a perspective view, on enlarged scale, of the transducer shown in FIG. 1.
Figure 3:
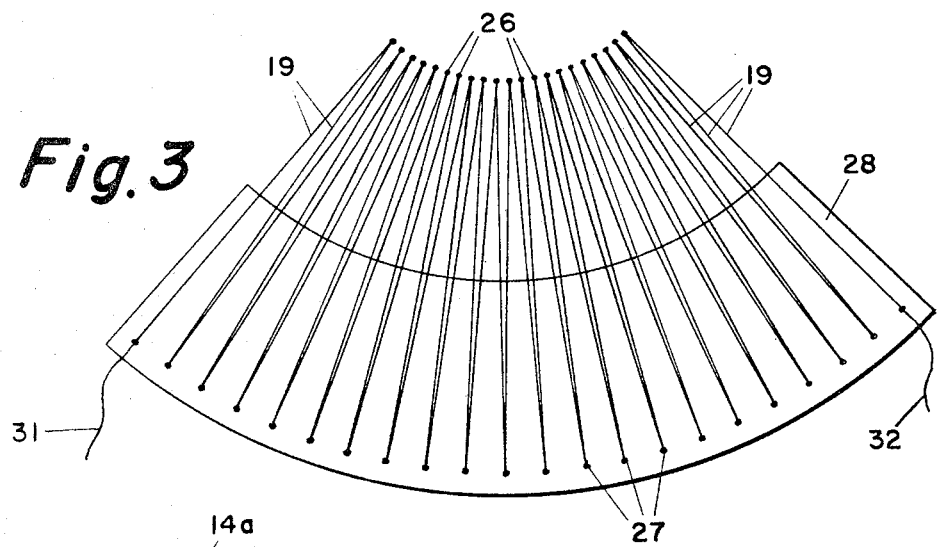
Figure 4:
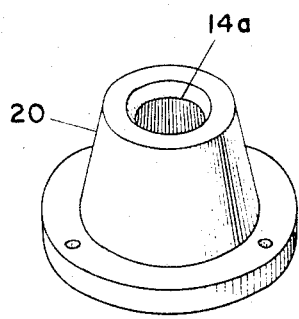
Figure 5:
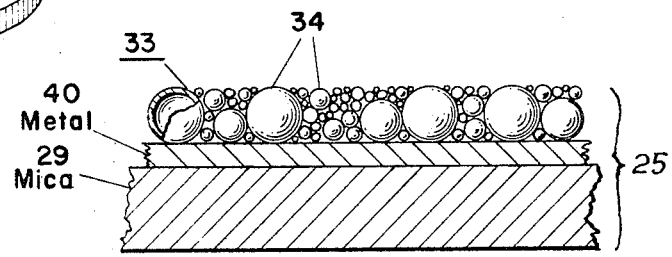

FIG. 3, on further enlarged scale, shows the thermopile unit of FIG. 2 in the flat before assembly;

FIG. 4 is a perspective view of the conical base of the assembled transducer of FIG. 2;

FIG. 5 is a sectional view, on greatly enlarged scale, of a small part of the target element of FIGS. 1, 2, 6, 7 and 8;

FIG. 6 is a perspective view of another thermopile type of transducer using the target construction of FIG. 5;

FIG. 7 is a perspective view of a transducer of the temperature-sensitive resistance type using the target construction of FIG. 5; and FIG. 8 is a sectional view of a radiation receiver head including a transducer of the type shown in FIGS. 6 or 7.

Figure 1:
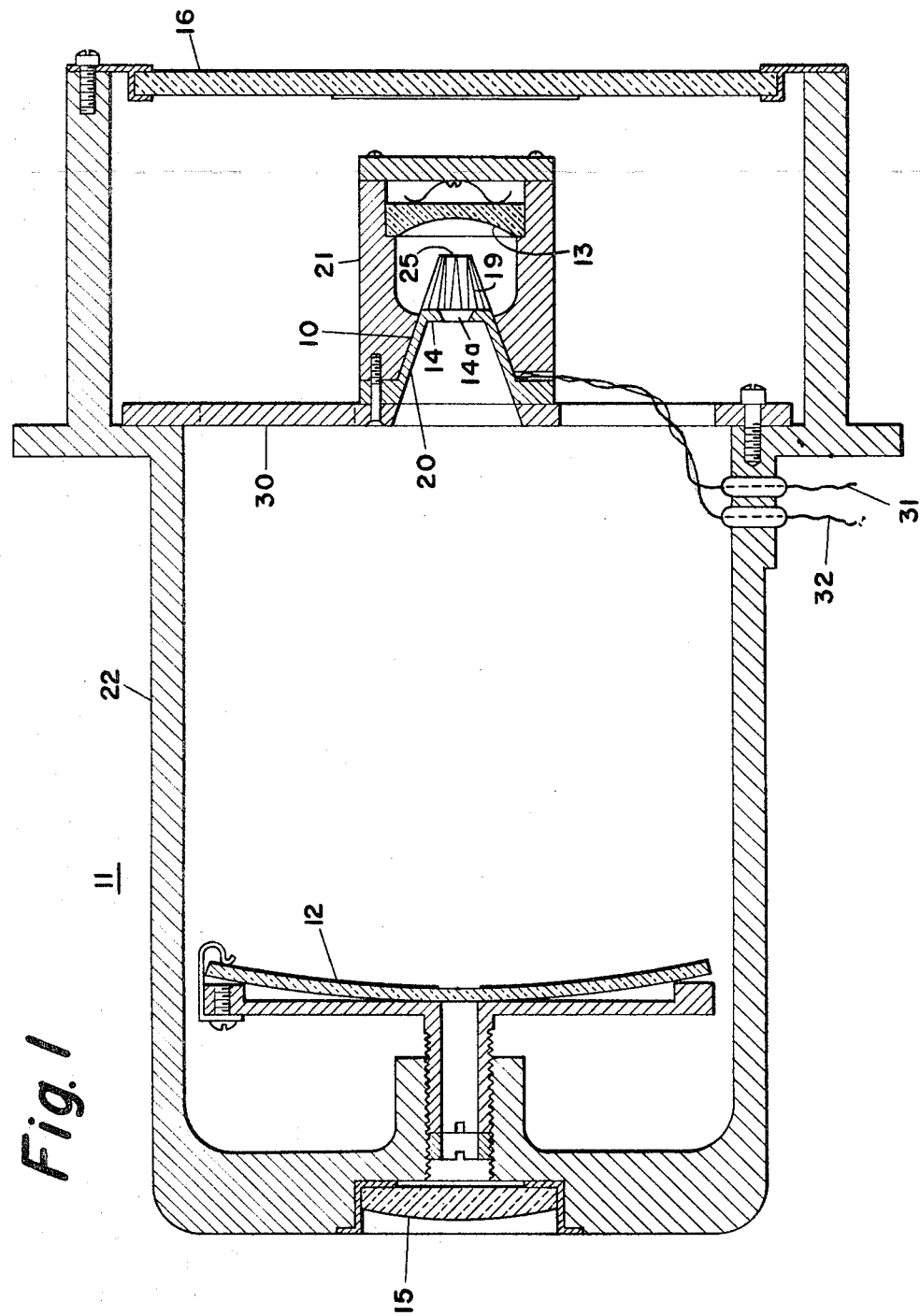
FIG. 1 is a sectional view of a radiation pyrometer using the preferred type of thermopile transducer.

Referring to FIGS. 1 and 2, one form of the invention is shown applied to the thermopile transducer 10 of a radiation pyrometer 11 of the two-mirror type fully described in United States Letters Patent 2,627,530 to W. G. Fastie and 2,813,203 to R. C. Machler. Briefly, the optical system of pyrometer 11 limits the energy received by the transducer 10 to that which is emanating from a sharply defined area of the surface of a hot body and is focused on the target or radiation receiver element 25 of the target. The narrow-angle concave mirror 12 produces, from the radiant energy passed by the window 16, an image of the source area on the diaphragm 14 which in this case is formed by the internal, smaller frustrum end of the conical base element 20 of the transducer. Radiation from only the sharply defined part of this image is passed by the diaphragm opening 14a to the wide-angle secondary mirror 13 which redirects and concentrates that radiation upon the target 25 of the transducer.

The thermocouples 19 of the transducer 10 of FIGS. 1 and 2 are arranged in the form of a cage having a truncated cone-like configuration. The larger end of the cage is closely fitted onto the conical base element 20 and extends therefrom with the "hot" or active junctions 26 intimately thermally connected to the target 25 at points substantially equally spaced throughout its perimeter. The geometric rigidity of the conical cage arrangement maintains the target in precise focus despite mechanical vibration to which the pyrometer may be subjected. The cage construction also makes it, practically, possible greatly to increase the number of thermocouples connected to the target: for example, as many as twenty-four thermocouples have been connected to a target having a diameter as small as 0.125 inch.

Specifically, the target 25 (FIG. 5) may be a thin disc 29 of mica about .003 inch thick upon which is deposited, except for a narrow peripheral area, a thin opaque coating 40 of aluminum or other metal. The hot junctions of the thermocouples are attached, as by a ceramic glaze or cement, about the uncoated periphery of the target disc (FIG. 2). The "cold" or reference junctions 27 of the thermocouples of FIGS. 1 and 2 are in intimate heat-transfer relation with a thin flexible metal band 28, preferably of anodized aluminum foil. Specifically, these junctions, although electrically insulated from the band 28 by the anodized coating, are mechanically bonded thereto in angularly spaced relation by a ceramic glaze or cement. The width of the band 28 is substantially equal to the slant height of the truncated-cone base 20.

The housing 21 (FIG. 1) for the thermopile transducer 10 is provided with a suitable mounting arrangement for positioning and holding therein the wide-angle mirror 13. The relatively thick left-hand base of the housing 21, which may be copper or other metal which is a good conductor of heat, has an opening so tapered that when the transducer unit 10 mounted on base 20 is fully inserted, the cold junctions 27 and the adjacent portions of the thermocouple wires are in intimate thermal transfer relation with but electrically insulated from the housing 21 and base 20. The receiver head formed by housing 21 and the transducer 10 mounted on base 20 is in turn fastened to a mounting spider 30, of copper or other suitable metal, which is fastened about its rim to the main housing 22 of the pyrometer.

The cage-like array of thermocouples 19 is preferably made by wrapping a preformed radial array, such as shown in FIG. 3, around the conical base 20 (FIG. 4) as a form. The flat array (FIG. 3), as made on an arcuate winding jig (not shown), is of arcuate extent somewhat less than 180°; the linear distance along the arc of the junctions 27 is slightly less than the periphery of the conical base 20 at its larger end, and the linear distance along the arc of the junctions 26 is slightly less than the perimeter of the target disc 25. The wrapped pairs of thermocouple wires are cemented to band 28 on one side of the winding form after the junctions have been welded at cross-over points. The excess lengths of wire are then cut away. The band 28 thus holds the thermocouples 19 in proper angular position as the flat array is wrapped around the conical base 20. With the cage thus formed and positioned in a jig, the target 25 may be brought into position for cementing of the thermocouple junctions 26 to the perimeter of the target.

Junctions 26 of thermocouples 19 are at the temperature of the target and junctions 27 are at the temperature of the conical base. Electrically, the thermocouples are in series and consequently the sum of their individual voltages, due to any temperature difference between the target 25 and the conical mount 20, is available at the output leads 31, 32 of the thermopile. The conical cage array of thermocouples provides a substantially larger number of junctions than previous arrangements for association with such a small target and hence produces a correspondingly higher output voltage for a given radiation intensity of the image on the target, and, unexpectedly, without significant decrease in the speed of response of the transducer to changes in image intensity.

It has also been found that the electrical output of the transducer 10, at least for temperatures in the range of about 400° F. to 1,000° F. could be very substantially enhanced by coating at least one face of the target 25 with a thin layer 33 (FIG. 5) of tiny, thin-walled hollow spheres 34 of glass, silica or like transparent dielectric. In comparison tests between similar radiation pyrometers differing only in the provision and omission of such coating, the output voltage was of the order of 50 percent higher with the coated target.

Specifically, the targets were coated with tiny hollow glass spheres having a diameter in the range of about 30 to 300 microns. A quantity of such spheres were agitated in distilled water and those which floated on the surface of the water were skimmed off and dried. Each of the target discs was prepared by application of a thin coating of a silicone varnish and then under a microscope the dried spheres were sifted on the freshly prepared target surface and leveled off to a thickness corresponding with the diameter of the largest sphere. The coated targets were then baked for several hours at 100° C. to set the cement.

Although a theory explanatory of the increased target temperature for a given radiation input has not been completely formulated, it is believed that the coating of tiny hollow spheres 34 provides a structural means of low thermal-mass in which the spheres jointly provide (a) a thin outer surface which passes input radiation to the receiving face of the target element; (b) thermal conduction bridges from such surface to the target element; (c) a narrow mass-free gap or space (the summation of the inner spaces of the spheres) in which re-radiation from the target is trapped and in which there are no air-conduction losses; and (d) a multiplicity of tiny cavities in which radiant energy is reflected back and forth, so imparting a black-body characteristic to the coating.

The transducer 10a of FIG. 6 is also of the thermopile type. In construction, it is smaller to that shown in FIG. 4 of the aforesaid Fastie patent; for enhancement of its electrical output without appreciable lowering of its speed of response, the face of the target 25 disposed for reception of the image of the diaphragm of the pyrometer is provided with a thin layer 33 of tiny hollow spheres of glass, silica, or the like as above discussed in connection with FIG. 5. In brief, the cold reference junctions 27 of the two diametrically opposite groups of thermocouples 19A, 19B are in intimate heat-transfer relation with the mounting ring 20A of suitable metal such as copper or nickel. These junctions though electrically insulated from ring 20a are mechanically connected thereto as by a suitable ceramic cement or frit. The hot or active junctions of the thermocouples 19A, 19B are in intimate heat-transfer relation with the target 25 although electrically insulated therefrom. The two groups of hot junctions 26 are mechanically bonded to the target disc 25 along two diametrically opposite arcs of its perimeter. The target 25 is thus suspended in the center of the mounting ring 20A by the two groups of thermocouples 19A and 19B.

The radiant energy transducer unit 10B of FIG. 7 is of the type in which the temperature-sensitive electrical means thermally associated with target 25 is a resistor instead of a thermopile. In construction, the transducer unit 10B is similar to that shown in FIG. 11 of the aforesaid Fastie patent, but, for substantial increase of its electrical output without appreciable decrease of speed of response, at least the image-receiving face of the target 25 is coated with a thin layer 33 of tiny hollow spheres or beads as above discussed in connection with FIG. 5.

Specifically, the temperature-sensitive element 19C is a bifilar spiral of fine resistance wire (preferably iron, platinum, copper or nickel) having a high temperature coefficient of resistance. This resistance element is suitably held as by ceramic cement in distributed heat-conductive relation to the target disc 25. The free ends of resistor 19C extend from the target disc to the terminal strips 35, 36 mechanically bonded to diametrically opposite points of the mounting ring 20A. Such bonding may be effected by dabs of ceramic frit which provide electrical insulation but good thermal conduction. The target 25 is thus suspended centrally of the mounting ring 20A.

Variations in intensity of the radiant image focused on the target 25 vary its temperature with consequent change in the resistance value of resistor 19C. Specifically, the temperature-responsive resistor 19C may be connected via the output leads 31, 32 in one arm of a bridge circuit having the reference resistor 37 in an adjacent arm of the bridge (see FIG. 11 of the aforesaid Fastie patent). The reference resistor 37 is wound on the mounting ring 20A and has the same temperature coefficient of resistance as the resistor 19C in compensation for changes in ambient temperature. The unbalance output voltage of the bridge including the transducer resistors 19C, 37 is thus a measure of the temperature-difference between the mounting ring 20A and the radiation-illuminated target 25. As discussed in connection with FIG. 5, such difference is enhanced by the provision on the target 25 of the thin layer 33 of tiny hollow beads, or equivalent structure.

For use of the transducer 10A or 10B in the radiation pyrometer 11 of FIG. 1, the spider 30 of FIG. 1 is replaced by a spider 30A of FIG. 8. The central portion 14A provides the diaphragm on which the narrow-angle mirror 12 forms an intense image of a portion of the remote radiation source and whose opening 14a passes radiation from the sharply defined part of the image to the wide-angle secondary mirror 13 within the transducer housing 21A. The mounting ring 20A of the transducer 10A or 10B is thermally connected to the outer housing 21A through the spaced metallic legs 38 (FIGS. 6, 7, 8). The housing 21A and closure, like the transducer housing 21 and its end closure (FIG. 1), are of metal, preferably copper, having a high heat-conductivity to form a thermal shield completely surrounding the transducer except for the diaphragm opening 14a.

Although the invention has been described in connection with preferred forms thereof, it will be understood that it comprehends modifications within the scope of the appended claims.

What is claimed is:
1. A radiant-energy transducer including
   a target having an area for receiving radiation from an external source,
   temperature-sensitive electrical means in thermal-conductive relation to said target area,
   the combination of said target and said electrical means producing at temperature equilibrium of the target an electrical output which is representative of the radiation input from said source and which changes with change of radiation input at a rate dependent upon the thermal time-constant of the combination, and means for substantially enhancing the electrical output of said combination without materially increasing the time-constant thereof comprising a coating of tiny transparent dielectric hollow beads on at least one face of the target to provide structural means of relatively low thermal mass in the path of radiation to said target area and having a surface in close-spaced relation to said area and in thermal-conductive relation therewith.

2. A radiant-energy transducer as in claim 1 in which said beads are of glass or silica.

3. A radiant-energy transducer as in claim 1 in which the temperature-sensitive electrical means comprises a temperature-sensitive resistance element distributed over the radiation-receiving area of the target.

4. A radiant-energy transducer as in claim 1 in which the temperature-sensitive electrical means comprises at least one thermocouple element with the heat-receiving junction in thermal-conductive relation to said target area.

5. A radiant-energy transducer as in claim 1 in which the temperature-sensitive electrical means comprises a radial array of pairs of thermocouple elements having their hot junctions attached to said target at points spaced substantially uniformly about the perimeter thereof.

6. A radiant-energy transducer as in claim 1 in which the temperature-sensitive electrical means comprises an array of pairs of thermocouple elements having their hot junctions bonded to said target at points spaced substantially uniformly throughout the perimeter thereof and with said elements extending therefrom in the form of a cage having a truncated cone-like configuration with said target as a frustrum surface intermediate and spaced substantially from both the base and apex of the cone.

7. A multijunction thermopile suited for a radiation pyrometer comprising a target having a radiant-energy receiving area, and an array of pairs of thermocouple elements having junctions bonded to said target at points spaced substantially uniformly throughout the perimeter thereof and with said elements extending radially and augularly therefrom in the form of a cage having a truncated cone-like configuration with said target as a frustrum surface intermediate and spaced substantially from both the base and apex of the cone.

8. A multijunction thermopile as in claim 7 in which said target has at least one face coated with a thin layer of transparent dielectric hollow beads having diameters in the range of 20 to 300 microns.

9. A multijunction thermopile as in claim 7 additionally including a flexible heat-conductive band electrically insulated from and mechanically bonded to said thermocouple elements adjacent the larger end of the conical cage formed thereby.

10. A multijunction thermopile as in claim 7 additionally including a heat-conductive base member of truncated cone shape fitting within and electrically insulated from the larger end of the hollow truncated cone formed by said thermocouple elements and supporting said elements.

11. A multijunction thermopile as in claim 10 in which said base member is hollow with an optical diaphragm-opening therein.

12. A multijunction thermopile as in claim 11 additionally including a housing internally shaped to fit onto said conical base and thermocouple assembly, said housing being in intimate heat-transfer relation to the thermocouple elements but electrically insulated therefrom, and a mirror within said housing for focusing radiation passed by said diaphragm opening onto said target.

13. A multijunction thermopile comprising a heat-conductive target disc for receiving radiation, a heat-conductive member in the shape of a truncated cone having a base and a frustrum end of circumference substantially greater than the circumference of said target disc and spaced substantially from both the base and apex of the cone, and a subassembly comprising in-the-flat, a thin heat-conductive arcuate portion not exceeding 180° and of mean length substantially corresponding with the mean circumference of said conical heat-conductive member, and a multiplicity of pairs of thermocouple wires bonded to said arcuate portion in a radial array and extending beyond the smaller radius of said arcuate portion with junctions spaced along an arc, said subassembly being shaped into cone-like configuration with said arcuate portion forming a band engaging said conical heat-conductive member throughout its circumference and with said thermopile junctions attached to said target disc at points substantially uniformly spaced about the circumference thereof.

References Cited
UNITED STATES PATENTS

| | | | |
|---|---|---|---|
| 2,580,293 | 12/1951 | Gier et al. | 136—213 |
| 2,601,508 | 6/1952 | Fastie | 136—214 |
| 2,627,530 | 2/1953 | Fastie | 136—214 |
| 2,813,203 | 11/1957 | Machler | 136—214 X |

ALLEN B. CURTIS, *Primary Examiner.*

WINSTON A. DOUGLAS, *Examiner.*